United States Patent
Li et al.

(10) Patent No.: US 10,706,197 B2
(45) Date of Patent: Jul. 7, 2020

(54) AUTOMATED ELECTROMAGNETIC INTERFERENCE FILTER DESIGN

(71) Applicant: Hitachi, Ltd., Tokyo (JP)

(72) Inventors: Jia Li, Novi, MI (US); Tianye Ma, Northville, MI (US); Yuan Xiao, Northville, MI (US); Heming Chen, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 15/987,945

(22) Filed: May 24, 2018

(65) Prior Publication Data

US 2019/0362044 A1 Nov. 28, 2019

(51) Int. Cl.
*G06F 30/367* (2020.01)
*G01R 31/00* (2006.01)
*G06F 30/36* (2020.01)
*G06F 30/327* (2020.01)

(52) U.S. Cl.
CPC ......... *G06F 30/367* (2020.01); *G01R 31/002* (2013.01); *G06F 30/327* (2020.01); *G06F 30/36* (2020.01)

(58) Field of Classification Search
CPC ............. G06F 17/5086; G06F 17/5036; G06F 17/5063; G06F 17/505; G06F 30/367; G06F 30/327; G06F 30/36; H02M 1/44; H02P 27/16; G01R 31/002
See application file for complete search history.

(56) References Cited

U.S. PATENT DOCUMENTS

| 7,231,614 | B2 * | 6/2007 | Best | G06F 17/5045 716/103 |
| 8,806,409 | B2 | 8/2014 | Duff | |
| 2010/0308649 | A1 * | 12/2010 | Kono | B60L 9/005 307/9.1 |
| 2010/0325599 | A1 * | 12/2010 | Perry | G06F 17/50 716/122 |

(Continued)

OTHER PUBLICATIONS

"Automatic EMI filter Design Through Particle Swarm Optimization", by Federico Viani, Fabrizio Robol, Narco Salucci, and Renzo Azaro, IEEE, Aug. 4, 2017*

(Continued)

*Primary Examiner* — Nha T Nguyen
(74) *Attorney, Agent, or Firm* — Mattingly & Malur, P.C.

(57) ABSTRACT

In some examples, a system may receive a plurality of parameters for a filter design, including a noise parameter. The system may determine a plurality of candidate filter configurations based on at least one of the received parameters. The system may further determine, for each candidate filter configuration of the plurality of candidate filter configurations, based on a trained machine learning model, an estimated electromagnetic interference (EMI) noise associated with each candidate filter configuration. The system may select at least one of the candidate filter configurations based on the estimated EMI noise. In some cases, the system may perform a simulation using the selected candidate filter configuration. Based on the results of the selecting and/or the simulation, the system may send information related to the at least one selected candidate filter configuration to a computing device.

20 Claims, 10 Drawing Sheets

(56) References Cited

U.S. PATENT DOCUMENTS

| | | | | |
|---|---|---|---|---|
| 2012/0075012 | A1* | 3/2012 | Bailey | G11B 20/10009 |
| | | | | 327/553 |
| 2014/0137069 | A1* | 5/2014 | Duff | H03H 11/1221 |
| | | | | 716/132 |
| 2015/0331984 | A1* | 11/2015 | Mellteg | G06F 17/5063 |
| | | | | 716/132 |
| 2016/0004810 | A1* | 1/2016 | Solodovnik | H02P 27/16 |
| | | | | 703/7 |
| 2017/0117813 | A1* | 4/2017 | Lee | G01R 31/40 |
| 2018/0364656 | A1* | 12/2018 | Tian | G05B 19/0426 |
| 2019/0122689 | A1* | 4/2019 | Jain | G06N 3/08 |
| 2019/0303520 | A1* | 10/2019 | Silver | G01R 23/167 |

OTHER PUBLICATIONS

Extended European Search Report received in corresponding European Application No. 191579311 dated Oct. 16, 2019.

Di Piazza, M. C. et al., "ODEF: an Interactive Tool for Optimized Design of EMI Filters", IECON 2016 42nd Annual Conference of the IEEE Industrial Electronics Society, Oct. 23, 2016, pp. 5013-5019.

Lie, B. et al., "An Efficient Method for Antenna Design Optimization Based on Evolutionary Computation and Machine Learning Techniques", IEEE Transactions on Antennas and Propagation, Sep. 26, 2013, pp. 7-18.

\* cited by examiner

AUTOMATED ELECTROMAGNETIC INTERFERENCE FILTER DESIGN

BACKGROUND

In a vehicle electric motor drive system, high frequency switching of a power inverter may introduce electromagnetic interference (EMI) to other onboard electronic devices. Furthermore, recent increased availability of silicon carbide (SiC) and gallium nitride (GaN) devices has enabled power inverters to operate at higher switching frequencies, which can increase the amount of EMI. The generated EMI noise currents, referred to as conducted EMI noise, may travel along the input and output power lines and cause interference with other electronic systems. To avoid interference between different systems, the EMI noise emissions from power inverters and/or power converters may be controlled to comply with certain electromagnetic compatibility (EMC) standards, which are specified by automotive manufactures, international standards organizations, and/or government entities.

EMI filters may be included with, or otherwise associated with, power converters and/or power inverters to provide attenuation for the conducted EMI noise. Usually, EMI filters are positioned in the input part of power converters/inverters, but in some applications, filters may be employed for both input and output locations. While EMI filters can attenuate the conducted EMI noise to meet the EMC standards, EMI filters may bring additional weight and volume, as well as increasing the cost of power converters/inverters. However, it can be difficult to design a suitable EMI filter that is light-weight, compact, low-cost, and still able to filter out undesirable EMI noise in a manner sufficient to meet EMC requirements. Conventional design techniques may involve a great deal of trial and error, often requiring multiple iterations for tuning filter component values, which can be inefficient and time-consuming.

SUMMARY

Some implementations include arrangements and techniques for designing filters for reducing electromagnetic interference (EMI) noise. In some examples, a system may receive a plurality of parameters for a filter design, the plurality of parameters including a noise parameter. The system may determine a plurality of candidate filter configurations based on at least one of the received parameters. The system may further determine, for each candidate filter configuration of the plurality of candidate filter configurations, based on a trained machine learning model, an estimated EMI noise associated with each candidate filter configuration. The system may select at least one of the candidate filter configurations based on the estimated EMI noise. In some cases, the system may perform a simulation using the at least one selected candidate filter configuration. Based on the results of the selecting and/or the simulation, the system may send information related to the at least one selected candidate filter configuration to a computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
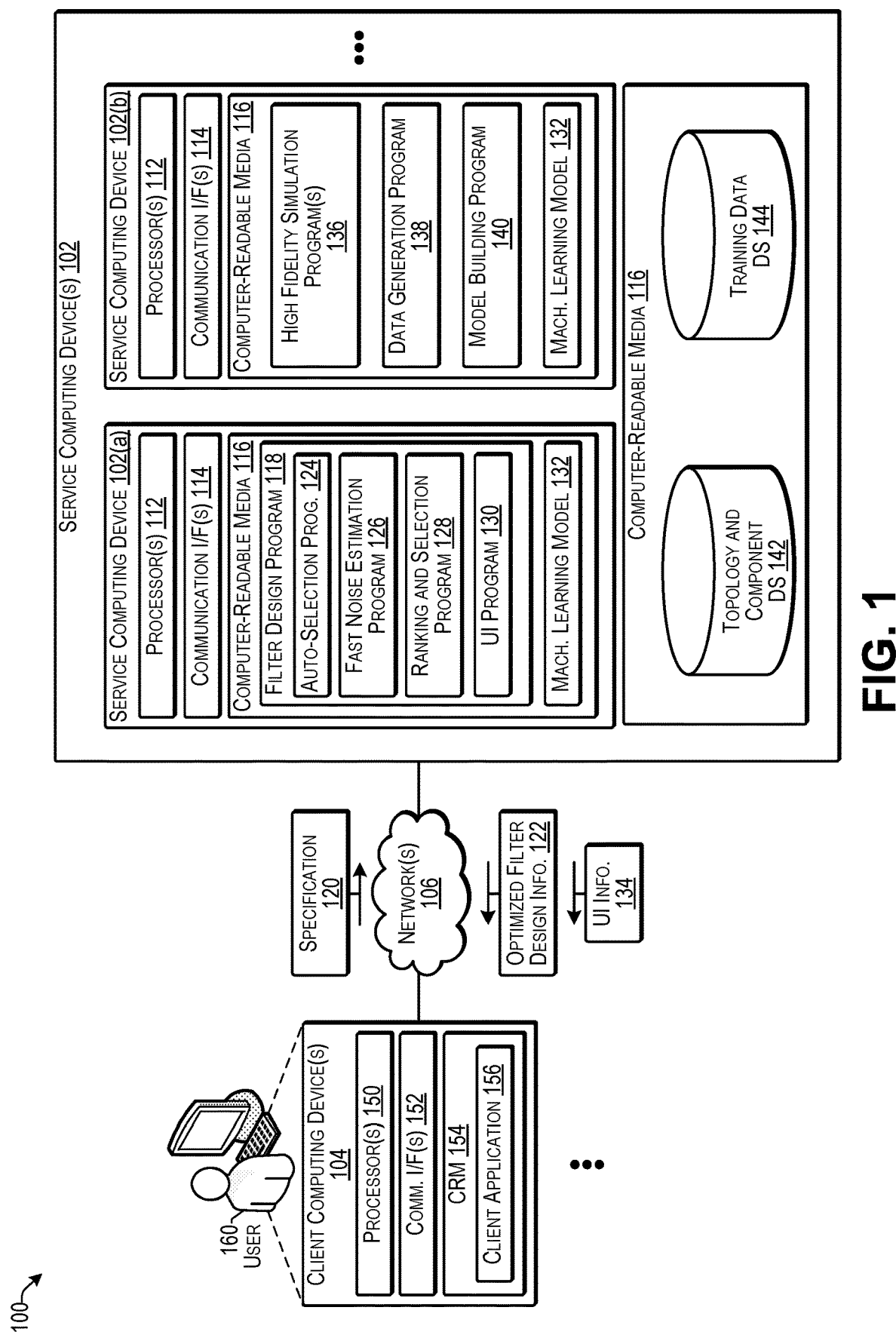
FIG. 1 illustrates an example system for performing automated filter design according to some implementations.

The technology herein includes novel arrangements and techniques for designing and generating an EMI filter. Some examples include an automated filter design tool that significantly reduces the time for determining an optimal filter design for a particular system, as compared with conventional filter design methods. The filter design techniques herein streamline the overall filter design process to eliminate reworking and resizing steps that are typically required in conventional filter design methods. Further, the filter design techniques herein may be executed on a variety of hardware, such as a user's local computer, one or more remote servers, combinations thereof, and so forth.

Some implementations herein determine correlations between filter configurations and EMI noise, such through use of a machine learning model, and use the determined correlations to evaluate a plurality of candidate filter configurations that meet indicated cost and size parameters. The system may initially identify a first plurality of candidate filter configurations based on a specification received for generating a filter for a particular system, such as based on size and cost parameters. After identifying the first plurality of candidate filter configurations, the filter design tool may use a machine learning model previously trained using training data to determine predicted EMI noise levels for the first plurality of candidate filter configurations.

Subsequently, a subset of one or more of the candidate filter configurations having the lowest predicted EMI noise levels are selected for a simulation phase. During the simulation phase, the system may perform a detailed high-fidelity simulation to obtain simulated EMI noise results for each candidate filter configuration in the subset. In some examples, the EMI noise of interest may be conducted emission noise. Because performing the high fidelity simulation may take an extensive amount of time and/or computing resources, implementations herein are able to limit in advance the number of candidate filter configurations subject to the high fidelity simulation, thereby providing a significant savings in time and computing resources required for determining an optimal filter configuration. Furthermore, in some examples, the high fidelity simulation phase may be skipped, and the process may proceed directly to the manufacture and verification of a prototype of the top selected filter design.

In some cases, the number of candidate filter configurations in the subset that are provided to the simulation phase may be an integer K specified by a user, specified by an administrator, or specified by a system default setting, the quantity of which may depend in part on available computing resources and/or a desired design completion time. Following the high fidelity simulation, at least one optimal filter design may be identified based on the results of the simulation. In some cases, the identified optimal filter design may be manufactured automatically, such as using a three-dimensional (3D) printer, one or more robotic devices, a computer automated manufacturing system, or may be otherwise constructed as a prototype to conduct physical real-world testing of the selected optimal filter design for verifying the simulation results and the selected filter design.

The examples herein enable effective reduction in the time for determining an optimal filter design by avoiding running simulations for a large number of filter candidates that meet the cost and size parameters for a particular application. The filter design techniques herein perform automated selection of filter candidates that meet the cost and size parameters to eliminate the manual redesign and optimization steps used in conventional design methods. Furthermore, the filter design techniques herein may be executed using multiple different computing devices, such as by using multiple servers. For example, a first server may execute a user interface and other functions of a filter design program for responding to user specifications, and a second server may train the machine learning model, execute a data generation program to generate training data by running high-fidelity simulations and providing the training data to a training data database or other data structure.

In some cases, a filter design program may include or may access a user interface (UI) program that may provide a user interface that enables the filter design program to receive a specification from a user that includes a plurality of filter parameters for an EMI filter for a system. For example, the user interface enables users to input their specifications, as well as the number K of best candidates that will be used for high-fidelity simulations. The filter design program may output EMI noise data of each of the top candidates and/or one or more graphs showing the EMI noise level vs. different frequency bands to help users to understand the performance of the selected filter design(s). The system may further include two databases or other types of data structures, namely a topology and component data structure that stores information for a large number of filter topologies and components, and a training data data structure that stores training data that may be used to train a machine learning model used by the filter design program.

Upon receipt of the user specification, the filter design program may execute an auto-selection program that accesses the topology and component data structure containing a large number of filter designs. The auto-selection program may identify a plurality of filter designs having topology and components that are determined to meet the parameters in the specification. The filter design program may use the machine learning model to determine which of the selected filter designs are likely to have EMI noise levels below the allowable EMI noise levels specified by the noise parameters in the user specification, while also meeting other parameters in the specification for size and cost of the filter. The filter design program may rank these candidate filter configurations based on the output of the machine learning model, and may select the K top-ranked candidate(s) for high fidelity simulation.

In the examples herein, the filter design tool may employ a machine learning model trained using experimental data or simulation data that comes from systematic models of systems that may include multiple filters, rather than single stand-alone filters. Thus, the filter design tool herein is able to determine the correlations between multiple filter configurations and EMI noise levels. For instance, in real-life implementations, multiple filters may be installed on a plurality of circuits or devices in a vehicle, and the noise suppression or attenuation performance of an individual filter may be substantially affected by impedances of these other circuits or devices. In some cases, the EMI noise effects posed by the other circuits or devices may be non-linear and therefore may be difficult or impossible to accurately calculate mathematically or theoretically. Thus, the filter design techniques herein may employ a machine learning model that not only bypasses the conventional time-consuming process of selecting the filter design candidates for high fidelity simulation, but that also takes into consideration the entire system or subsystem in which the filter will be installed.

Implementations herein are able to effectively overcome a time-consuming issue existing in the conventional filter design approaches by providing an automated filter design tool that incorporates machine learning and simulation-generated training data. As mentioned above, the conventional filter design approach relies on manual work, which starts with the selection of filter candidates based on cost/size requirements, and using the machine learning model and then running simulations to narrow down these candidates to those which meet noise limitations. Due to a large number of filter candidates that meet the cost and size requirements and the long simulation time, usually ranging from hours to days, determining an optimal filter design using conventional techniques may be a time consuming process that may make it impossible for designers to provide quick feedback or respond to changes in customers' requirements.

Some examples are related to EMI filter design including both low voltage (LV) and high voltage (HV) filters, and thus can be used for power electronic devices such as inverters and converters that are in need of suppressing conducted emission (CE) EMI noise caused, e.g., by rapid switching operations or the like. Further, implementations herein may be used to manage the size of the filters as well as the cost. For instance, filters may form a significant portion of the total volume of power devices. With the arrangements and techniques herein, the whole filter design process can be streamlined to eliminate the manual reworking steps for enabling an effective reduction in time and computing resources used to determine the optimal design.

For discussion purposes, some implementations are described in the environment of a filter design program for reducing EMI noise in vehicle applications. However, implementations herein are not limited to the particular examples provided, and may be extended to other service environments, other applications, other types of noise reduction filters, and so forth, as will be apparent to those of skill in the art in light of the disclosure herein.

FIG. 1 illustrates an example system 100 for performing filter design according to some implementations. The system 100 includes at least one service computing device 102 that is able to communicate with at least one client computing device 104, such as through one or more networks 106. In the illustrated example the service computing device(s) 102 include a first service computing device 102(a) and a second service computing device 102(b). In other examples, however, more or fewer service computing devices 102 may be used, one or more of the service computing devices 102 may be embodied as virtual machines, different types of hardware may be used for different service computing devices 102, or the like.

In some examples, the service computing device(s) 102 and/or client computing device(s) 104 may include one or more servers, personal computers, or other types of computing devices that may be embodied in any number of ways. For example, in the case of a personal computer, the programs, other functional components, and at least a portion of data storage may be implemented on the personal computer and/or may be partially implemented at a network location, such as through cloud-based storage, cloud-based processing, or the like. Alternatively, in the case of a server, the programs, other functional components, and at least a portion of data storage may be implemented on at least one server, such as a stand-alone server, or a server in a cluster of servers, a server farm or data center, a cloud-hosted computing service, and so forth, although other computer architectures and hardware configurations may additionally or alternatively be used.

In the illustrated example, each service computing device 102 includes, or may have associated therewith, one or more processors 112, one or more communication interfaces (I/Fs) 114, and one or more computer-readable media 116. Each processor 112 may be a single processing unit or a number of processing units, and may include single or multiple computing units, or multiple processing cores. The processor(s) 112 can be implemented as one or more central processing units, microprocessors, microcomputers, microcontrollers, digital signal processors, state machines, logic circuitries, graphics processing units, systems on chips, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the service computing device 102, while in other examples, the computer-readable media 116 may be partially remote from the service computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the service computing device 102. Functional components stored in the computer-readable media 116 of the first service computing device 102(a) may include a filter design program 118. The filter design program 118 may include one or more computer programs, computer-readable instructions, executable code, or portions thereof that are executable to cause the processor(s) 112 to receive a specification 120 including filter parameters from the client computing device 104, and determine an optimized filter design 122 that may be provided to the client computing device 104, or otherwise implemented, based on the received specification 120.

In the illustrated example, the filter design program 118 may include or may access a plurality of additional programs including an auto-selection program 124, a fast noise estimation program 126, a ranking and selection program 128, and a user interface (UI) program 130. For example, as discussed additionally below, the auto-selection program 124 may determine a plurality of initial candidate filter configurations based on the specification 120. The fast noise estimation program 126 may use a machine learning model 132 to predict the EMI noise levels for the plurality of initial candidates. The ranking and selection program 128 may rank the initial candidates based on the predicted noise levels, and may select the top candidates for performing high fidelity simulation. In addition, the UI program 130 may generate a graphic user interface (GUI) information 134 that may be provided to the client computing device 104 to enable the client computing device 104 to present a GUI (not shown in FIG. 1), as described additionally below.

Furthermore, functional components stored in the computer-readable media 116 of the second service computing device 102(b) may include one or more high fidelity simulation programs 136, a data generation program 138, and a model building program 140. For example, the high fidelity simulation program 136 may include any of various commercially available simulation programs able to simulate vehicle systems and electromagnetic interference on those systems. Several examples of suitable high fidelity simulation programs that may be employed in some implementations herein include HFSS/SIMPLORER, available from ANSYS, INC., of Canonsburg, Pa., USA; CST STUDIO SUITE available from CST OF AMERICA, LLC, Framingham, Mass., USA; and FEKO from ALTAIR ENGINEERING, INC., of Troy, Mich., USA.

In addition, the data generation program 138 may access a topology and component data structure (DS) 142 to execute simulations using the high fidelity simulation program 136 to generate additional training data that is stored in a training data data structure (DS). Furthermore, the model building program 140 may access the training data data structure 144 to generate and/or update the machine learning model 132 and provide the latest version of the machine learning model 132 to the ranking and selection program 128.

Additional functional components maintained in the computer-readable media 116 of the service computing device(s) 102 may include an operating system (not shown in FIG. 1)

that may control and manage various functions of the service computing devices 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the machine learning model 132, the topology and component data structure 142, and the training data data structure 144. In some examples, the topology and component data structure 142 and/or the training data data structure 144 may be stored as databases managed by a separate data storage server, or the like, (not shown in FIG. 1), while in other examples, one or more of the service computing devices 102(*a*) or 102(*b*) may include a storage management function for managing the data structures 142 and/or 144.

The service computing devices 102 may also include or maintain other functional components and data, which may include programs, drivers, etc., and other data used or generated by the functional components. Further, the service computing devices 102 may include many other logical, programmatic, and physical components, of which those described above are merely examples that are related to the discussion herein.

Additionally, in some examples, a first portion of the operations described herein may be performed by a first one of the service computing devices 102, and another portion of the operations may be performed by a second one of the service computing devices 102. As one example, one or more first service computing devices 102(*a*) may execute the filter design program 118 to determine top candidate filter configurations, while one or more second service computing devices 102(*b*) may execute the high fidelity simulation program 136 to determine whether the selected filter designs perform as expected and which of multiple designs might be optimal. Alternatively, as still another example, a single service computing device 102 may perform all of the functions described herein. Numerous other variations in workload distribution will be apparent to those of skill in the art having the benefit of the disclosure herein.

The communication interface(s) 114 may include one or more interfaces and hardware components for enabling communication between the service computing devices 102 and communication with various other devices, such as over the one or more networks 106. Thus, the communication interfaces 114 may include, or may couple to, one or more ports that provide connection to the network(s) 106 for communicating with the client computing device(s) 104. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102 and the client computing device(s) 104 are able to communicate over the one or more networks 106 using wired or wireless connections, and combinations thereof.

The client computing device(s) 104 may include one or more processors 150, one or more communication interfaces 152, and one or more computer-readable media 154. In some examples, the client computing device(s) 104 may have a hardware configuration similar to the service computing device(s) 102 discussed above. For example, the one or more processors 150 may include any of the examples of processors 112 discussed above, the one or more communication interfaces 152 may include any of the examples of communication interfaces 114 discussed above, and the one or more computer-readable media 154 may include any of the examples of computer-readable media 116 discussed above.

The computer-readable media 154 on the client computing device(s) 104 may include a client application 156 for enabling a user 160 to interact with the filter design program 118 such as through a user interface provided by the user interface program 130. For example, the client application 156 may communicate with the filter design program such as through the user interface program 130 for providing the specification 120, and for receiving the optimize filter design information 122. As one example, the client application 156 may be a browser or the like and the graphic user interface information 134 may be a web-based interface provided by the UI program 130. As another example, the client application 156 may be a dedicated application specifically configured to interact with the filter design program 118, and which may include the capability of generating at least a portion of the graphic user interface based on duty information 134 received from the UI program 130. Numerous other variations will be apparent to those of skill in the art having the benefit of the disclosure herein.

Figure 2:
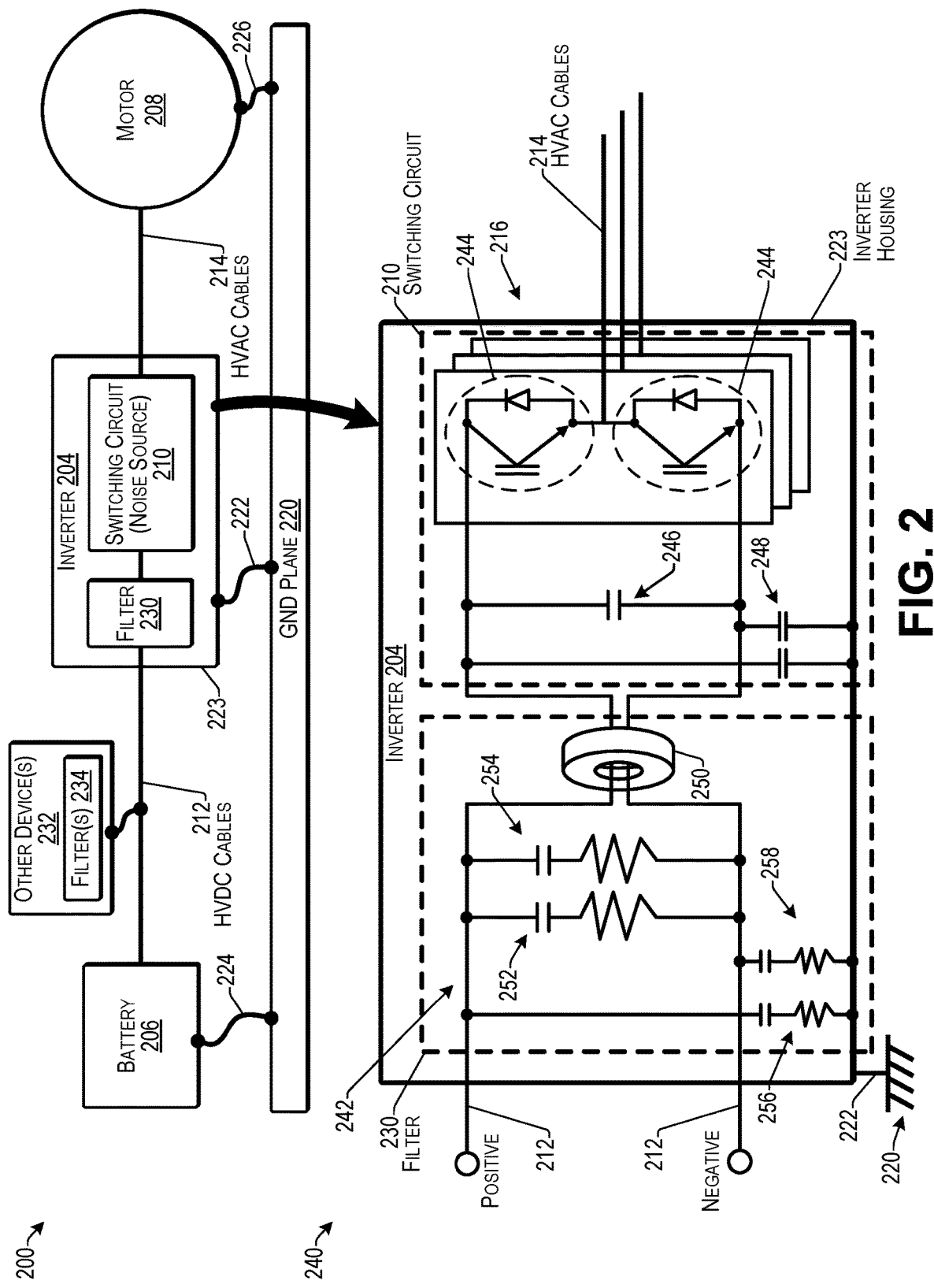
FIG. 2 illustrates an example of a vehicle system and filter topology according to some implementations.

FIG. 2 illustrates an example of a vehicle system and filter topology 200 according to some implementations. In this figure, the example vehicle system includes an inverter 204, a battery 206, and a motor 208. For instance, the inverter 204 may include a switching circuit 210 that receives DC power from the battery 206 through high voltage DC (HVDC) cables 212 and that converts the DC power to AC power that is transmitted through high-voltage AC (HVAC) cables 214 to the motor 208. Various types of switching circuits may be used; however, as one example, the switching circuit 210 may include a three-phase IGBT (insulated-gate bipolar transistor) circuit 216 that converts the high voltage DC current to an imperfect or modified sine wave, such as a multiple step sinusoidal AC waveform. In other examples, the switching circuit 210 may generate a square wave, a perfect sine wave, or other AC waveform. Accordingly, implementations herein are not limited to any particular type of AC output for the inverter 204. The inverter 204 may further include various other components, such as a gate drive circuit and a motor control circuit (not shown in this example) for performing various fun.

The inverter 204, the battery 206, and the motor 208 may be grounded to a ground plane 140, which may correspond to a vehicle main ground such as the vehicle body, vehicle frame, vehicle chassis, or the like. For instance, the inverter 204 may be electrically connected to the ground plane 220 by a grounding connection 222, such as a grounding strap, direct connection, or the like. For instance, an inverter housing 223 of the inverter 204 may be grounded to the ground plane 220 by the grounding connection 222. Similarly, the battery 206 may be grounded to the ground plane 220 by a grounding connection 224, and the motor 208 may be grounded to the ground plane 220 by a grounding connection 226.

As mentioned above, the EMI generated by the system 200, if not controlled, may interfere with other on-board electronic devices. Accordingly, the inverter 206 and the remainder of the system 200 may be configured to comply with EMC standards prescribed by both international organizations like ISO (International Organization for Standardization) and vehicle manufacturers. The EMC standards may specify limits on RE (Radiated Emission) and CE (Conducted Emission) as well as the thresholds of input/output signals for immunity tests. CE EMI noise is voltage/current disturbances that are conducted along power supply lines. For example there may typically be two types of power supply circuits can be identified in power electronic devices, one is the LV (Low Voltage) power supply circuit (not shown in FIG. 2) and the other is the HV (High Voltage) power supply circuit (including HVDC cables 212, inverter 204, and HVAC cables 214). The LV power supply circuit may provide lower voltage DC voltages to power control circuits and the like.

On the other hand, HV may be provided either by a HV battery pack (i.e., battery 206) or directly from rectifier circuits that connect to a power grid (not shown in FIG. 2). Correspondingly, CE EMI noise can be further divided into LVCE and HVCE in which LVCE pertains to the CE EMI noise conducted on LV power supply lines while HVCE pertains to the CE EMI noise conducted on HV cables. The sources for LVCE noise may include EMI noise from a switch-mode voltage regulator, oscillator circuit and gate drive integrated circuits (not shown in FIG. 2). In the case of bad EMC design, the above-mentioned rapid switching operation can also cause serious LVCE issues. Further, HVCE noise may typically be caused by the above-mentioned rapid switching operation of the switching circuit 210. Both LVCE and HVCE limitations may be specified by EMC regulations. The frequency ranges of these limitations may typically range from 0.1 kHz to 108 MHz, in which AM band and FM band limitations are most strict and thus are the most concern to filter designers.

To reduce LVCE and HVCE noise, an EMI filter, such as filter 230, may be installed between the switching circuit 210 and the battery 206 and/or other devices 232 in the system 200. For example, the vehicle may include various other devices, such as a converter, an entertainment system, electronic control units, on-board computers, a powertrain control module, a cellular communications interface, a Wi-Fi interface, and so forth. Furthermore, in some examples, one or more of these other devices 232 may include at least one other filter 234. For instance, a converter might be included for stepping down the voltage from the battery 206 such as for charging an auxiliary battery or providing 12 volt power to certain vehicle components. In some examples, an EMI filter may be included with the converter as the filter 234 for reducing EMI noise generated by the converter. Numerous other variations will be apparent to those of skill in the art having the benefit of the disclosure herein.

The filter 230 and other filter(s) 234 may be designed to not only have excellent EMI noise suppression performance, but also to meet other design parameters from customers such as cost and size limitations. For example, the filter may be designed fit within a housing of the inverter 204, and it may be desirable that the filter components not weigh a significant amount. The techniques herein enable automated design of an optimized filter that may meet all of a customer's parameters, such as may be specified in a specification, in an efficient manner that reduces the computer resources consumed during simulation and that substantially increases the speed at which an optimal filter can be designed.

In the illustrated example, FIG. 2 further includes an enlarged view 240 of the inverter 204, illustrating an example of the IGBT circuit 216 used as the switching circuit 210, and further illustrating an example topology 242 of an example filter 230 that may be generated by the filter design tool herein. In this example, the IGBT circuit 216 includes six IGBTs 244 (i.e., two IGBTs 244 for each phase) that allow the control of current/voltage using a small voltage for producing a three-phase AC output from the HVDC input. Further, a capacitor 246 may be included between a positive line and a negative line as a DC link capacitor with a large value for maintaining a solid voltage across the switching circuit 110 and, along with grounding capacitors 248, which may be grounded to the inverter housing 223, or the like, to help protect the switching circuit 110 from momentary voltage spikes or surges.

Several different types of analog EMI filters are suitable for use as the EMI filters herein, including Pi filters and T filters. Pi filters may include an inductor surrounded by at least first and second capacitors. An input capacitor is selected to offer low reactance and repel a majority of the EMI noise. On the other hand, a T filter may employ two shunt inductors and a coupling capacitor. Depending on the sizing of the various filter components (capacitors, inductors, resistors, etc.), such single-stage filters may serve as low pass filters, high pass filters, band pass filters, and band stop filters.

In the illustrated example topology 242, the filter 230 is configured as an example Pi filter that includes an inductor core 250, a first capacitor-resistor pair 252 and a second capacitor-resistor pair 254 extending between the positive line and the negative line, a third capacitor-resistor pair 256 connecting the positive line to ground 220, via grounding to the inverter housing 223, and a fourth capacitor resistor pair 258 connecting the negative line to ground 220 via grounding to the inverter housing 223. Furthermore, the example topology 242 is only one example of numerous possible filter topologies and filter component configurations that may be designed and implemented according the system and techniques herein. Implementations herein are not limited to any particular filter topology or filter type, but are intended to encompass all filter designs that may be used for controlling EMI in noisy systems. Similarly, the example switching circuit 210 described herein is just one example of a possible EMI noise source for illustrative purposes. The implementations for filter design herein may be applied to numerous other EMI noise sources that may be subject to control of the EMI noise generated thereby.

Figure 3:
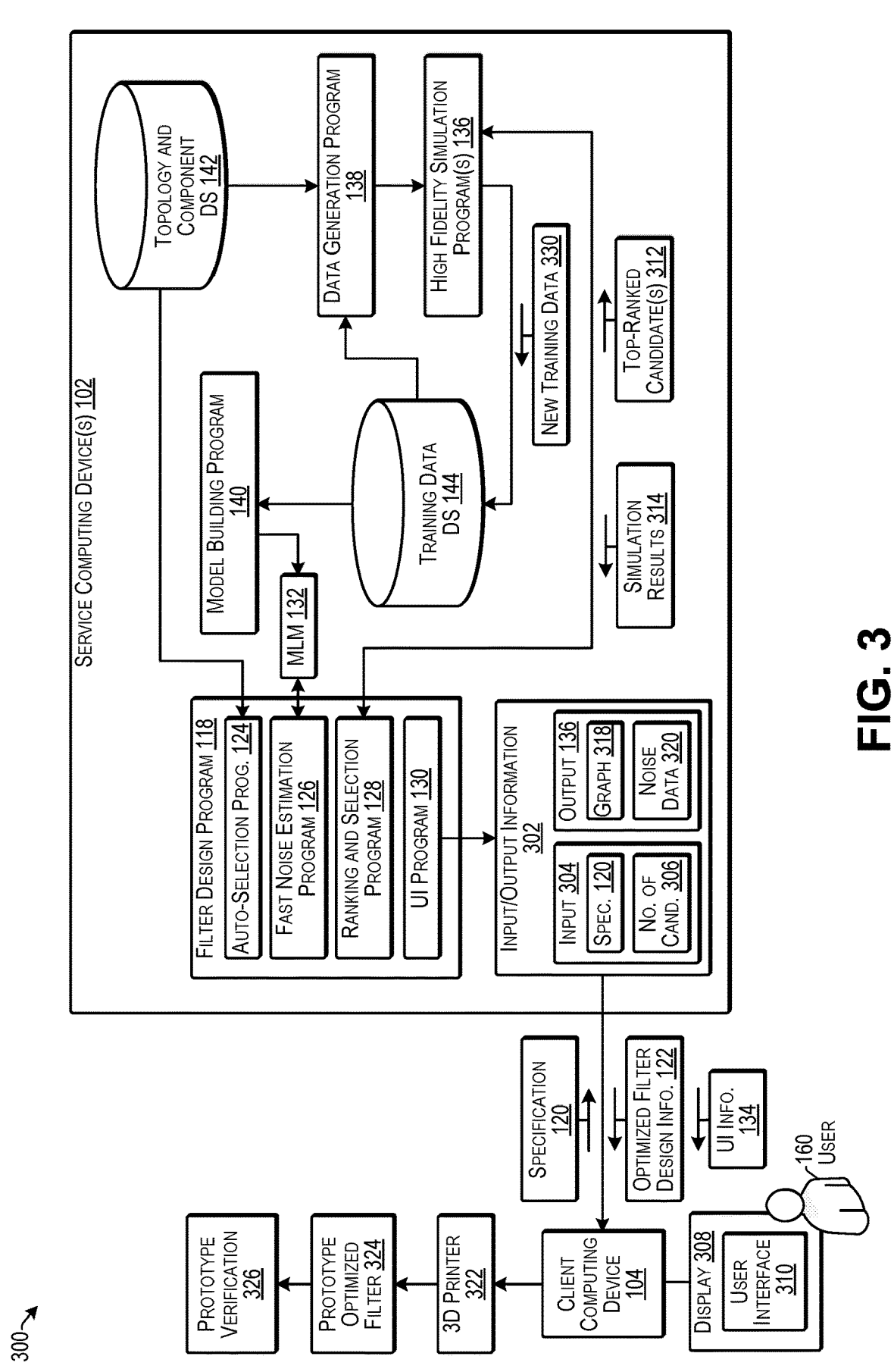
FIG. 3 illustrates an example of interaction among components of the filter design tool according to some implementations.

FIG. 3 illustrates an example 300 of interaction among components of the filter design tool according to some implementations. In this example, input/output information 302 of the filter design program 118 is illustrated as including input 304, which may include the specification 120 received from the client computing device 104 and the number of candidates 306 to select for high fidelity simulation. For instance, the client computing device 104 may include a display 308 that is connected to, or otherwise associated with, the client computing device 104 for presenting a user interfaced 310 to the user 160. The user 160 may use the user interface 310 to submit the specification 120 and the number of candidates 306 to select for simulation to the UI program 130 of the filter design program 118. Alternatively, in some examples, the number of candidates 306 may be specified by default.

As mentioned above, the specification 120 may include specified EMI noise limitations for the filter and desired cost and size limitations for the filter. In some examples, the specification 120 may further include information about the system for which the filter is being designed. For example, the information about the system may be provided to the high fidelity simulation program 136 so that the high fidelity summation program 136 may perform a simulation over the entire system rather than only for the specific component with which the filter will be used. Accordingly, the specification 120 may include information about the other devices and filters in the system, such as the other devices 232 and other filters 234 discussed above with respect to FIG. 2.

Following receipt of the input 304, the filter design program may perform processing to determine an optimized filter design as discussed additional below with respect to FIG. 5. For example, the auto-selection program 124 may access the topology and component data structure to determine a plurality of candidate filter topologies and components, which may be provided to the fast noise estimation program 126. The fast noise estimation program 126 may use the machine learning model 132 to determine a noise estimation for each of the candidate filter topologies and components. The ranking and selection program 128 may receive the noise estimations and may rank them from highest estimated noise to lowest estimated noise, such that the candidate filter configurations having the lowest estimated noise are the top ranked candidates. The ranking and selection program 128 may select a number of the top-ranked candidates 312 having the lowest estimated noise in accordance with the number candidates 306 specified in the input 304, and may submit these top-ranked candidates 312 to the high fidelity simulation program(s) 136 for performing a simulation on the selected candidates. For example, the high fidelity simulation programs may perform a systemic simulation that takes into account other filters and EMI noise sources in the system, and may return simulation results 314 for each of the top ranked candidates 312. In some examples, the simulation results 314 may include an associated graph 318 that represents the EMI noise level versus different frequency bands and/or noise data 320 that specifies the noise at particular frequencies of interest specified in the specification 120.

In response to receiving the simulation results 314, the ranking and selection program may determine whether the simulation results 314 indicate that the EMI noise level is below the EMI noise level specified in the specification 120 received from the client computing device 104. Furthermore, for each of the candidates filter designs having the noise level that is below the specified noise level, the ranking and selection program 128 may compare the estimated cost and size of the candidate filter configuration with the cost and size in the specification 120, and may select one or more of the candidate filter configurations that most closely correlates with the specification 120. Based on the selection, the UI program 130 may send optimized filter design information 122 that includes the topology and components of the selected candidate, along with the corresponding graph 318 and noise data 320. Additionally, as mentioned above, in alternative examples, the high fidelity simulation step may be skipped, and the ranking and selection program 128 may merely send one or more of the top-ranked candidates 312 to the client computing device 104 as the optimized filter design information 122.

In some examples, in response to receiving the optimized filter design information 122, the client computing device 104 may send the optimized filter design information 122 to a 3D printer 322 or other automated manufacturing system or device, such as a computer aided manufacturing system, a robot system, or the like. The automated manufacturing system may generate a prototype optimized filter 324. Subsequently, the prototype optimized filter 324 may be subjected to a prototype verification as indicated at 326.

In addition, FIG. 3 also illustrates operation of the data generation program 138 and the model building program 140. For example, the machine learning model 132 may be generated and/or refined offline and/or separately from the execution of the filter design program 118. For example, the model building program 140 may access the training data data structure 144 when training the machine learning model 132. In some examples, the machine learning model 132 may be an artificial neural network or other suitable machine learning model. As several non-limiting examples, the machine learning model 132 may include a recurrent neural network, long short term memory (LSTM) neural network, or any of various other neural networks or deep learning models, stochastic models, such as Markov models and hidden Markov models, regression models, and so forth. Additional details regarding training of the machine learning model 132 are discussed below with respect to FIG. 8.

In addition, the data generation program 138 may be executed to generate new training data 330 that may be added to the training data data structure 144. For example, the data generation program may select various filter designs from the topology and component data structure 142 and may submit these designs to the high fidelity simulation program 136 for simulation with various different system designs, such as assistant discussed above with respect to FIG. 2. Accordingly, the output of the high fidelity simulation program 136 may include the new training data 330, which may include, e.g., estimated noise data for the selected filter design topology and components. Periodically, the model building program 140 may access the training data data structure 144 to retrain the machine learning model 132 based on the newly received training data, and may provide the updated machine learning model 132 to the fast noise estimation program 126.

Figure 4:
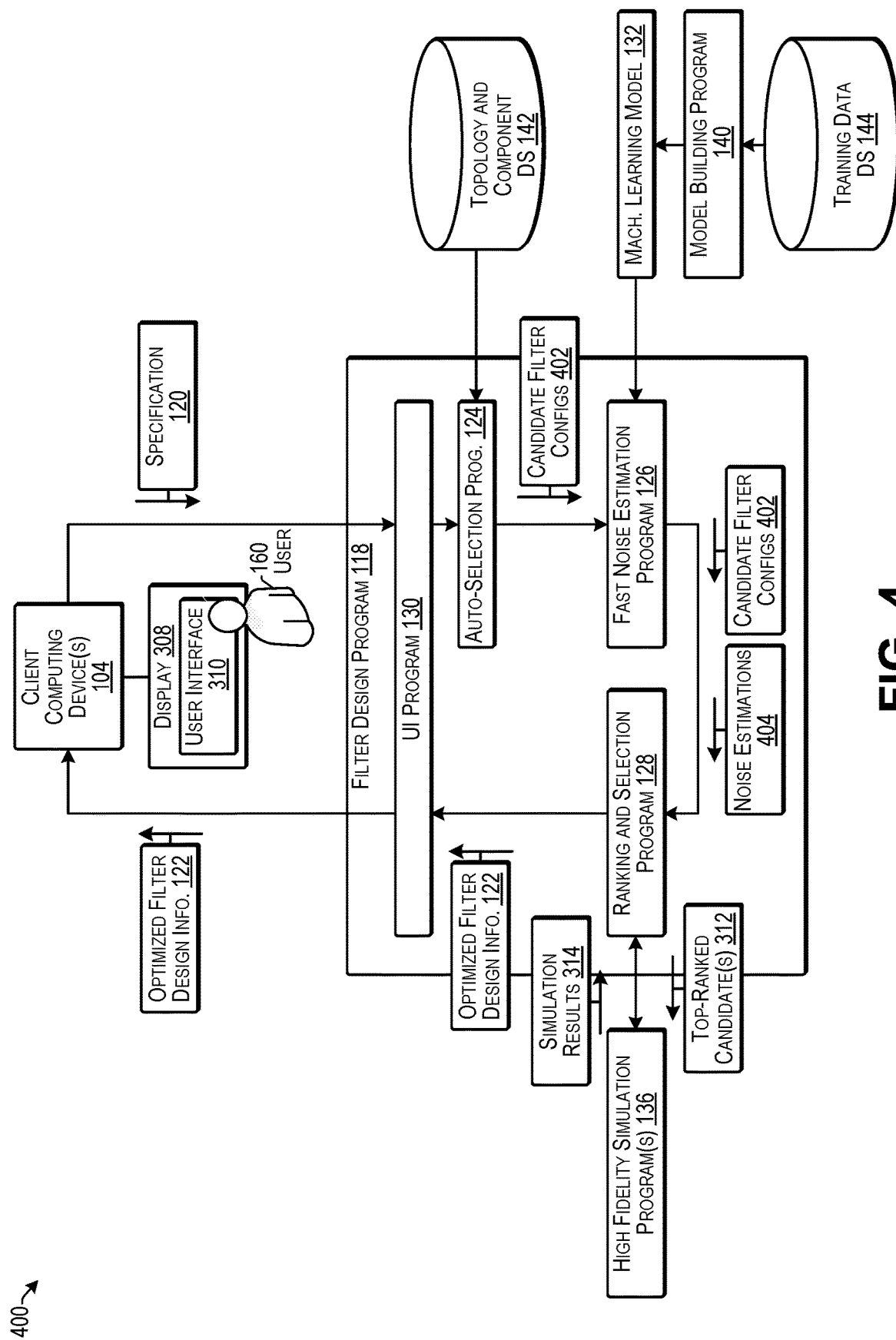
FIG. 4 illustrates an example of interaction between the programs of the filter design program according to some implementations.

FIG. 4 illustrates an example 400 of interaction between the programs of the filter design program according to some implementations. In this example, the filter design program 118 includes or accesses four programs, sub-programs, subroutines, or the like (referred to hereinafter as "programs"), which include the auto-selection program 124, the fast noise estimation program 126, the ranking and selection program 128, and the UI program 130.

The auto-selection program 124 may be executed to compare all the filter configurations stored in topology and component data structure 142 with the design parameters specified in the specification 120 received from the client computing device 104 via the user interface 310. For example, the design parameters included in the specification 120 may be input by the user 160 via the user interface 310 and received by the auto-selection program 124 from the user interface program 130. The auto-selection program 124 may determine from the topology and component data structure 142 all the filter design configurations that meet the cost and size specifications. Additional details of the process and algorithm executed by the auto-selection program 124 are discussed below with respect to FIG. 5. The auto-selection program 124 may provide a plurality of candidate filter configurations 402 to the fast noise estimation program 126.

The fast noise estimation program 126 may receive the plurality of candidate filter configurations 402 selected by the auto-selection program 124, and may input features of the candidate filter configurations 120 into the trained machine learning model 132. As mentioned above, the output of the machine learning model 132 is an estimated EMI noise level for each candidate filter configuration 312, such as a noise estimation 404 for a plurality of different frequencies of interest, such as in the AM and FM band ranges, or other specified frequencies. In some examples the noise estimations may be limited to or may include CE EMI noise estimations. The fast noise estimation program 126 may provide the candidate filter configurations 402 and the corresponding noise estimations 404 to the ranking and selection program 128.

The ranking and selection program 128 receives the noise estimations 404 and the corresponding candidate filter configurations 402, and may rank the candidate filter configurations 402 based on the corresponding noise estimations 404. For example, the ranking and selection program 128 may rank the candidate filter configurations 402 in the order of low noise level to high noise level. The ranking and selection program 128 may then use the ranked order information to select the K top-ranked filter design candidates 312 that may be subject to further detailed analysis through high-fidelity simulation.

The ranking and selection program 128 selects the K top-ranked filter candidates based the lowest noise level estimation, and may send the selected top-ranked candidates 312 to the high fidelity simulation program(s) 136 for further detailed analysis through execution of one or more simulation programs, which may include a simulation of the system in which the filter is intended to be used. For example, the simulation programs 136 may include a simulation of the components in the system 200 discussed above with respect to FIG. 2, such as an inverter simulation, a simulation of the motor, a simulation of the batter, and a simulation of the other devices and other filters, as well as simulation of the selected top-ranked filter design candidate.

The number K of the top ranked candidates 312 sent for analysis by high fidelity simulation may be set to be one or multiple candidates, and may be customized by the user 160 or by a system administrator. As one example, the user 160 may decide to select the top filter design candidates with the K lowest CE noise levels for the simulation analysis, and the number K may be predefined in a service agreement, may be predefined by default, or may be free to be changed by the user 160. Following receipt of the simulation results 314, as discussed above, e.g., with respect to FIG. 3, the optimized filter design information 122 may sent to the UI program 130, which sends the optimized filter design information 122 to the client computing device, such as for presentation in the user interface 310 and/or for generation of a prototype filter.

FIGS. 5-7 and 10 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

Figure 5:
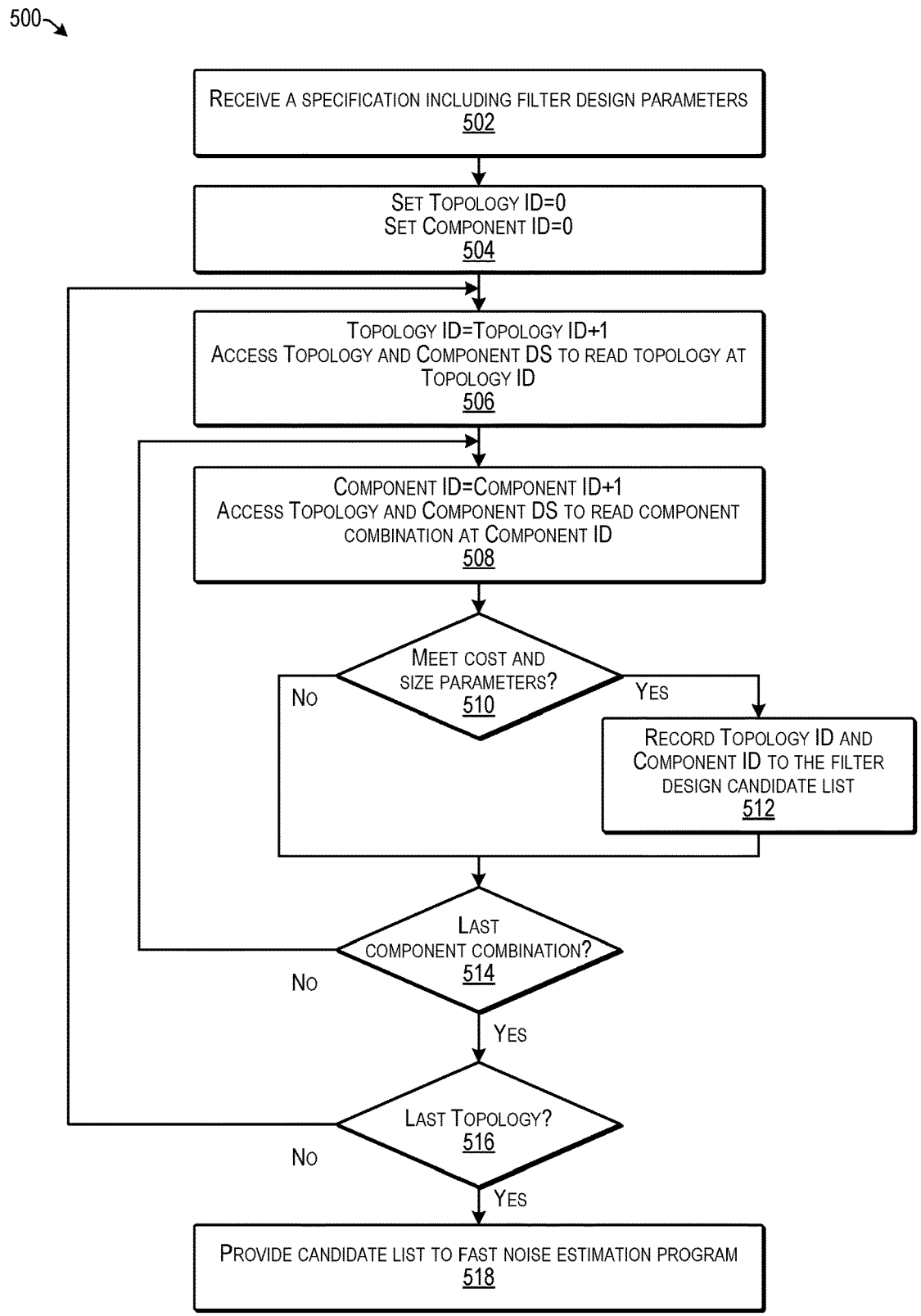
FIG. 5 is a flow diagram illustrating an example process according to some implementations.

FIG. 5 is a flow diagram illustrating an example process 500 according to some implementations. In some examples, the process 500 is executed by one or more processors executing the auto-selection program 124. Thus, the process 500 may be executed by the service computing device 102, as discussed above, or other suitable computing device.

At 502, the computing device may receive a specification including filter design parameters. For example, the computing device may receive a specification via a user interface and auto-selection program 124 may perform the selection process based on the received specification. In some examples herein, in the topology and component data structure 142, each filter design configuration may grouped according to filter topology ID (Topology ID) and according to component combination ID (Component ID). The Topology ID may indicate the type of filter topology, such as Pi type filter, T type filter, or the like. Furthermore, the component ID may correspond to the topology ID and may indicate various different component combinations. For example, in the case of a filter topology of the Pi type, the filter may include three components, i.e., two capacitors (C1 and C2) and one inductor or ferrite core (L1). Together, C1, C2 and L1 make up a component combination. In the case that there are 30 different possible capacitors C1, 20 different possible capacitors C2 and 10 possible inductors L1, then there are 6000 different possible combinations of components, and each different possible combination may be assigned unique or otherwise individually distinguishable Component ID. Whenever the auto-selection program starts, the Topology ID and the Component ID may be set to 0, and then as the Topology ID increases step by step, all the combinations under that topology may be searched and compared with the cost and size limitations in the received specification.

At 504, the computing device may set the Topology ID equal to zero and set the Component ID equal to zero.

At 506, the computing device sets the topology ID equal to topology ID+1, and the computing device accesses the topology and component data structure to read the topology at the current topology ID.

At 508, the computing device sets the Component ID equal to the Component ID+1, and the computing device accesses the topology and component data structure to read the component combination at the current component ID.

At 510, the computing device determines whether the selected component combination meets the cost and size parameters in the received specification. If so, the process proceeds to 512; if not, the process proceeds to 514. For example, EMI filters usually consist of passive components such as capacitors and inductors. Data regarding these components, including size/dimension information and cost/ price information are available from the component suppliers directly, the inverter design team, or various other sources. This data may be stored in a database or other data structure, and this data may be included in the topology and component data structure 142. During execution of the auto-selection program 124, as discussed above, e.g., with respect to FIG. 4, the auto-selection program may calculate or otherwise estimate the total volume and cost for various different filter topologies, and may then compare the calculations with a user's cost and size requirements set forth in the user's specification to determine the filter topologies that meet the user's specification. In some cases, the price, size, and 3D structure information may be provided for each possible component and the total size and cost can be estimated for any topology by combining the size and cost information from the component data structure 142. As one example, assume that the component data structure 142 includes information on two types of capacitors and three types of inductors, then for a Pi-type filter design configuration having two capacitors and one inductor, the auto-selection program may calculate 2*3*2=12 variants and may estimate the volume/cost for each variant.

At 512, if the selected component combination meets the cost and size parameters, the computing device records the topology ID and the component ID to the filter design candidate list.

At 514, the computing device determines whether the current component ID is the last component combination under the current topology ID. If so, the process proceeds to 516; if not, the process returns to 508 to access the next component combination under the current topology ID.

At 516, the computing device determines whether the current topology is the last topology in the topology and component data structure. If so, the process proceeds to block 518; if not, the process returns to block 506 to access the next topology in the topology and component data structure.

At 518, when the computing device has completed traversing the topology and component data structure to search for component combinations that meet the cost and size parameters in the received specification, the computing device may provide the candidate list to the fast noise estimation program as discussed above e.g. with respect to FIG. 4.

Figure 6:
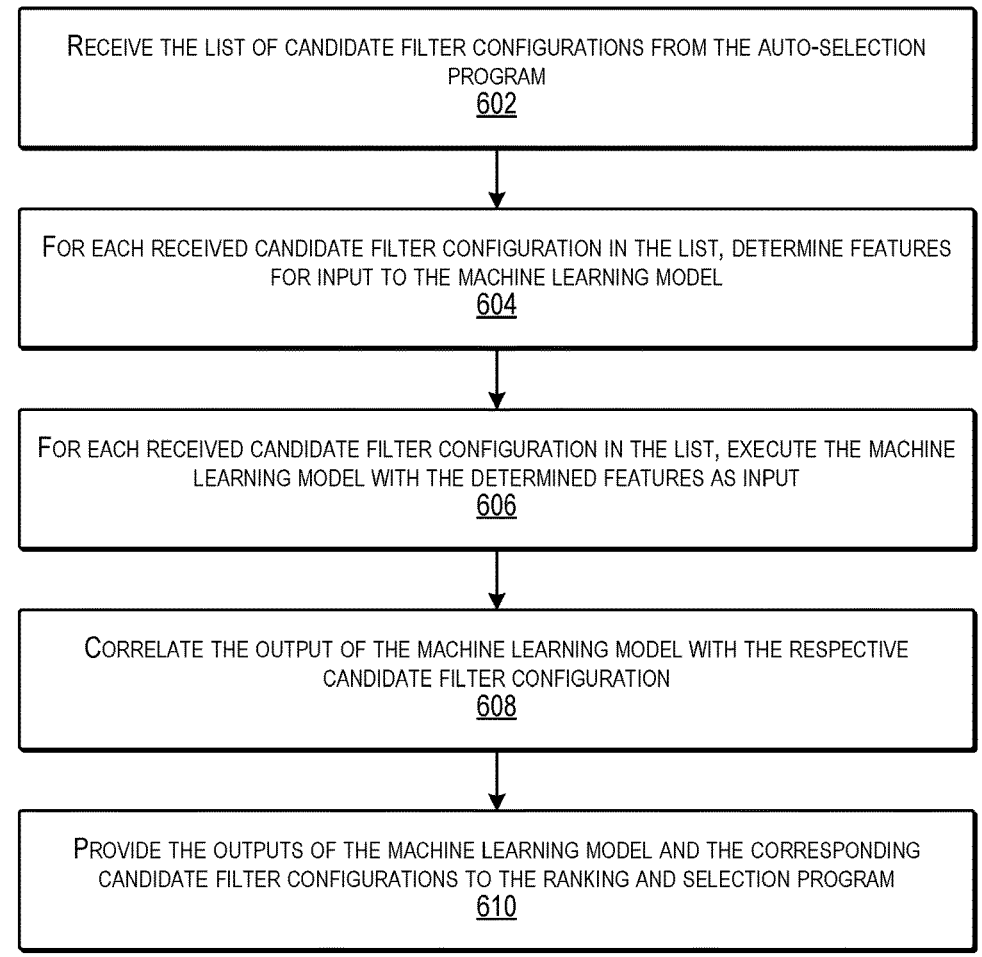
FIG. 6 is a flow diagram illustrating an example process according to some implementations.

FIG. 6 is a flow diagram illustrating an example process 600 according to some implementations. In some examples, the process 600 is executed by one or more processors executing the fast noise estimation program 126. Thus, the process 500 may be executed by the service computing device 102, as discussed above, or other suitable computing device.

At 602, the computing device may receive the list of candidate filter configurations from the auto-selection program.

At 604, for each received candidate filter configuration in the list, the computing device may determine features for input to the machine learning model.

At 606, for each received candidate filter configuration in the list, the computing device may execute the machine learning model with the determined features as input.

At 608, the computing device may correlate the output of the machine learning model with the respective candidate filter configuration. For example, the output of the machine learning model may be correlated with the Topology ID and the Component ID of the respective candidate filter configuration, as discussed above with respect to FIG. 5.

At 610, the computing device may provide the outputs of the machine learning model and the corresponding candidate filter configurations to the ranking and selection program, as discussed above, e.g., with respect to FIG. 4.

Figure 7:
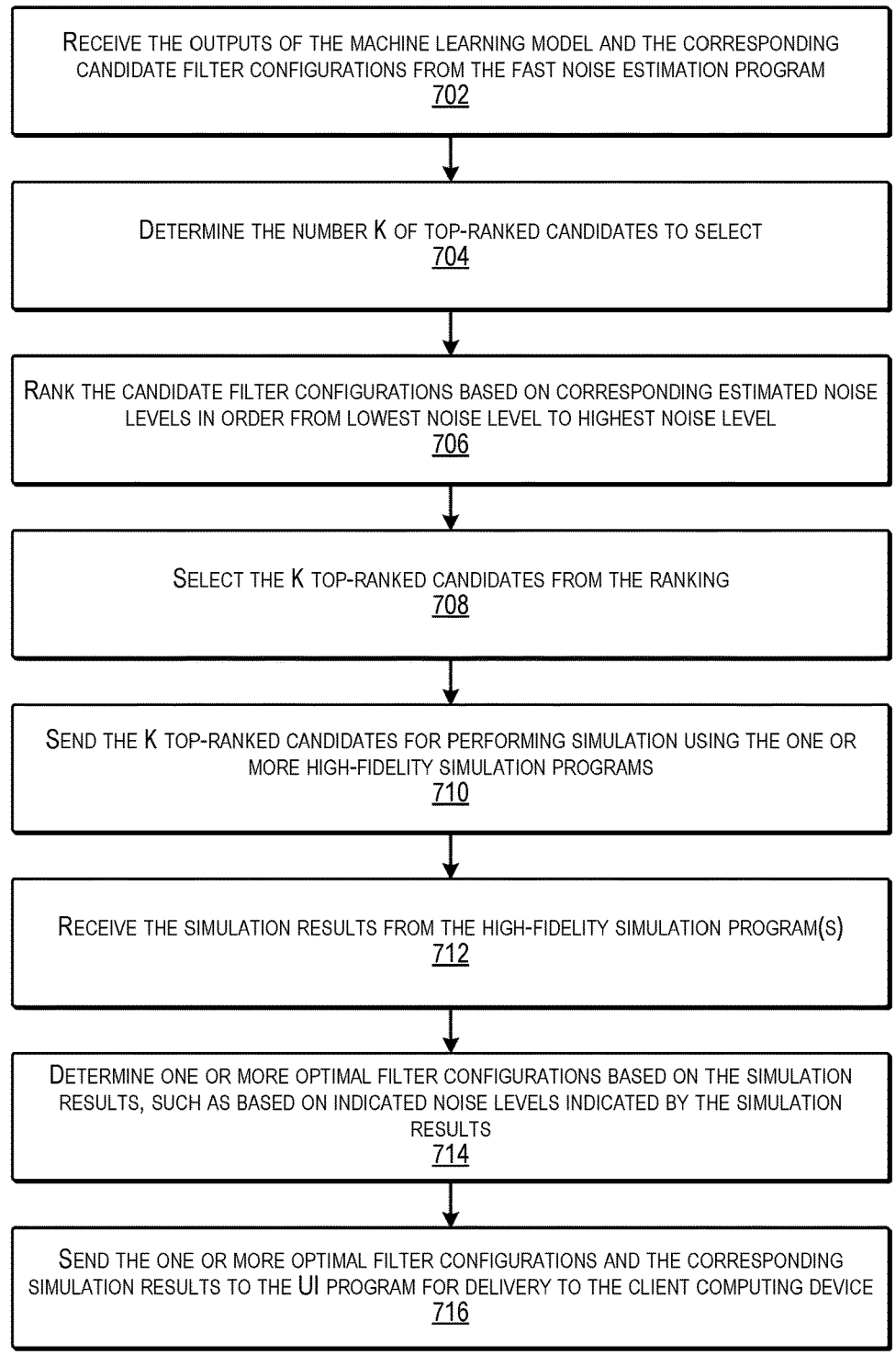
FIG. 7 is a flow diagram illustrating an example process according to some implementations.

FIG. 7 is a flow diagram illustrating an example process 700 according to some implementations. In some examples, the process 500 is executed by one or more processors executing the ranking and selection program 128. Thus, the process 500 may be executed by the service computing device 102, as discussed above, or other suitable computing device.

At 702, the computing device may receive the outputs of the machine learning model and the corresponding candidate filter configurations from the fast noise estimation program.

At 704, the computing device may determine the number K of top-ranked candidates to select. As mentioned above, the number K may be specified by the user, by a system administrator, by default, or the like.

At 706, the computing device may rank the candidate filter configuration based on corresponding estimated EMI noise levels in order from low noise level to highest noise level.

At 708, the computing device may select the K top-ranked candidates from the ranking.

At 710, the computing device may send the K top-ranked candidates for performing simulation using the one or more high fidelity simulation programs.

At 712, the computing device may receive the simulation results from the high fidelity simulation program(s).

At 714, the computing device may determine one or more optimal filter designs based on the simulation results, such as based on indicated EMI noise levels indicated by the simulation results. In some cases, the computing device may rank the K candidates based on the EMI noise levels indicated in the simulation results to determine the top performing filter design. In some examples, after high-fidelity simulation, the predicted noise level of all the best filter candidate configurations will have been determined. Based on these results, the system may provide a filter designer with a direct image of how the best filter candidates perform in terms of EMI noise attenuation. If none of the filter candidates meet the EMI noise limit specifications, the results of the processing may still indicate the best candidate designs to filter designers so the filter designers may know how close they are to meeting the EMC requirements and the relative costs and sizes of the candidate designs.

At 716, the computing device may send the one or more optimal filter designs and the corresponding simulation results to the UI program for delivery to the client computing device. In some cases, the computing device may send only the top performing filter design to the client computing device, while in other cases, the computing device may send all of the top K filter designs along with the corresponding simulation results to the client computing device.

Figure 8:
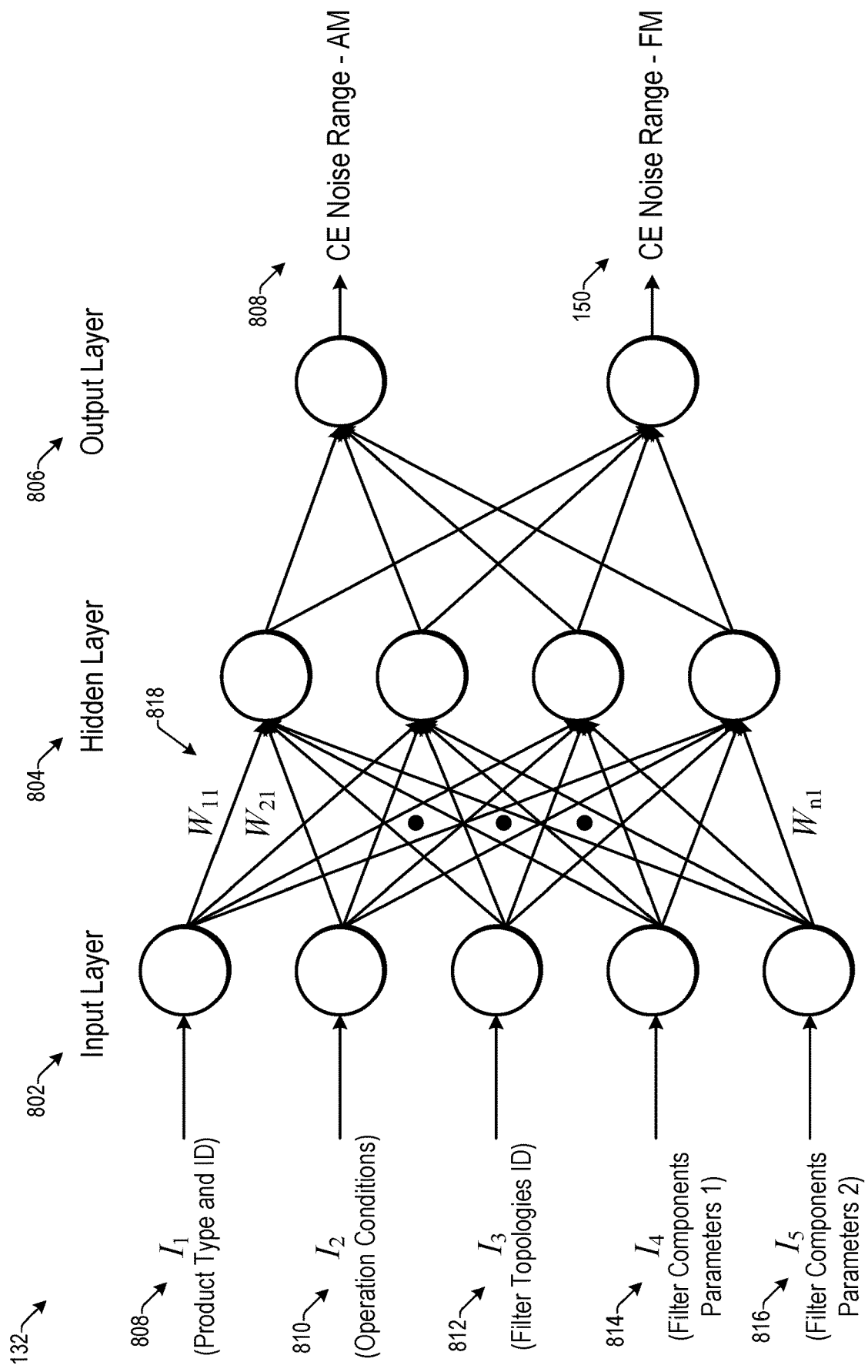
FIG. 8 illustrates an example of training a machine learning model according to some implementations.

FIG. 8 illustrates an example of training the machine learning model 132 according to some implementations. In some examples, the training may be performed by one or more processors executing the model building program 140. Thus, the training may be executed by the service computing device 102, as discussed above, or other suitable computing device.

The example of FIG. 8 represents a multilayer neural network architecture for noise estimation that includes an input layer 802, a hidden layer 804, and an output layer 806. In this example, the model building program 140 may be executed to train the neural network filter design data using the training data in the training data data structure 144 discussed above, e.g., with respect to FIG. 1, and discussed below with respect to FIG. 9. For example, the training data may include experimentally obtained data and may also include newly generated data that is generated by the data generating program 138 using the high fidelity simulation program(s) and the topology and component data structure 142, e.g., as discussed above with respect to FIG. 3. The model building program may initially only have access to raw data based on design specifications and filter topologies and parameters that are stored in the training data data structure. The initial raw data may be experimental data obtained through testing of various filter designs, and may be manually entered in some examples. The data generation program may be configured to automatically generate additional training data for the training data data structure, which may include product ID, product type, operational conditions, filter topology IDs and component values, as well as labeling data, such as CE noise and frequency band. An example of the configuration of the training data structure is illustrated and described below with respect to FIG. 9.

For training the machine learning model 132, the model building program may extract formal features and labels from the raw data. For example, for input data, different filter topologies may include different combinations of components, such as inductors and capacitors, as discussed above, e.g., with respect to FIG. 5. Furthermore, the model building program may normalize the data to be compatible for various combinations. Accordingly, inputs to the input layer 802 may include a plurality of features determined for each filter design, such as input $I_1$ (product type and ID) as indicated at 808; input $I_2$ (operation conditions) as indicated at 810; input $I_3$ (filter topology ID) as indicated at 812; input $I_4$ (filter component parameters 1) as indicated at 814; and input $I_5$ (filter component parameters 2) as indicated at 816. Through the training various weights $W_{11}$, $W_{21}$, through $W_{n1}$ may be determined.

In addition, in this example, the output labeling may include a first output 818 for CE noise range at the AM frequency band, and a second output 820 for CE noise range at the FM frequency band, although other outputs may be similarly determined. For validation, the extracted model building program may divide the extracted features into training data (e.g., 80%) and test data (e.g., 20%). The training data may be fed into the multilayer neural network 132 as discussed above for training the machine learning model 132. After training the neural network, the test data may be used to validate the accuracy of the trained neural network for estimating EMI noise levels. As one example, if the test accuracy is above a threshold level, e.g., 80% accurate, 85% accurate, etc., the trained machine learning model 132 may be deployed for use by the fast noise estimation program in conjunction with the filter design program for predicting the CE noise range in the AM band and FM band range for performing the filter design functions discussed above. Otherwise, if the accuracy is below the threshold, the machine learning model may be trained more, such as with additional experimental data or using simulation data obtained from by the data generation program via high-fidelity simulation as discussed above, e.g., with respect to FIG. 3. Thus, the model building program may continue to train the neural network to improve the accuracy until the accuracy achieves the specified threshold.

Figure 9:
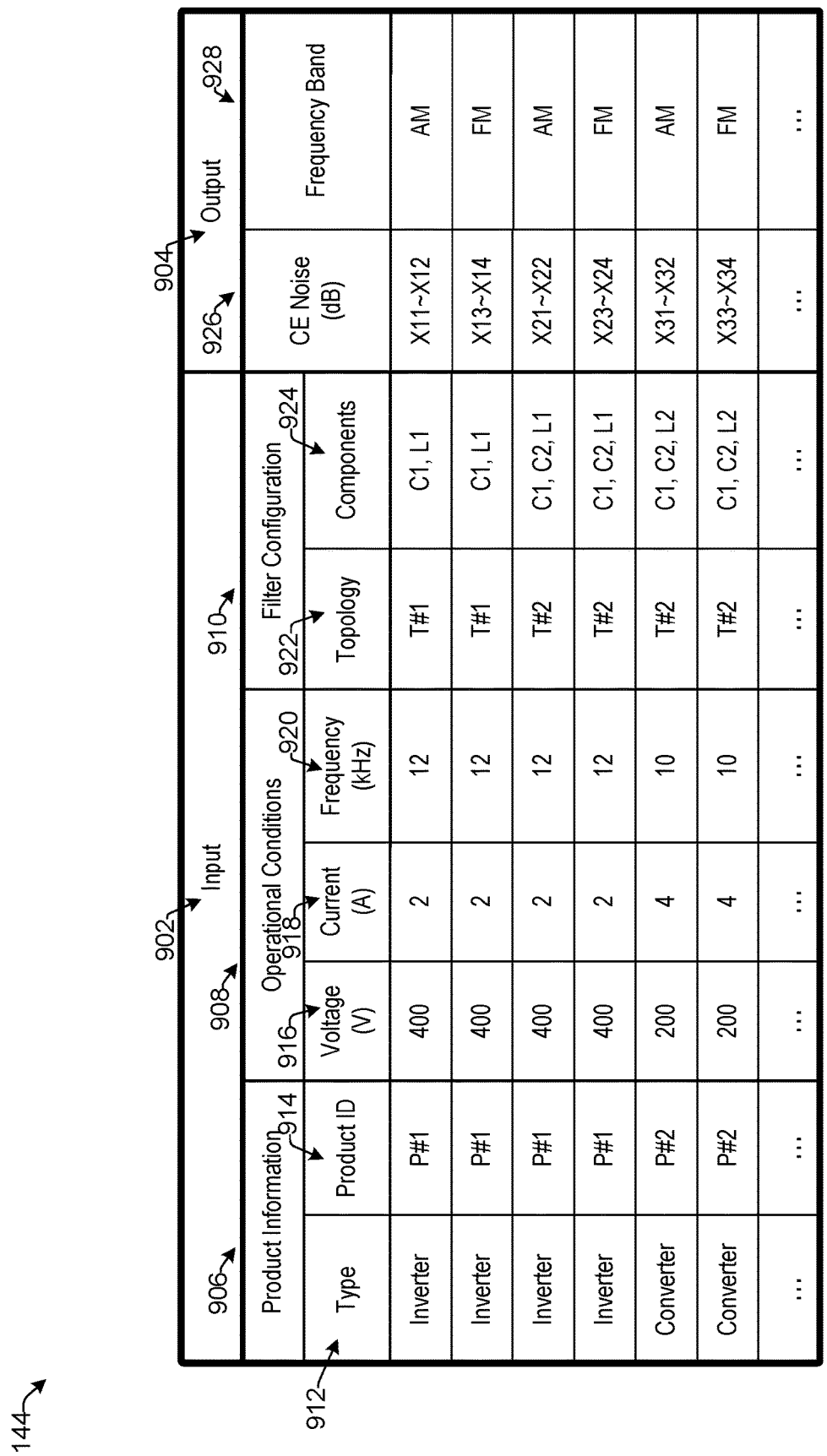
FIG. 9 illustrates an example configuration of a training data structure according to some implementations.

FIG. 9 illustrates an example configuration of the training data data structure 144 according to some implementations. As mentioned above, the training data data structure 144 may be used to store the training data for training the machine learning model 132. The data format for the training data data structure 144 may be predefined or customized One example of a data format for the training data data structure 144 is illustrated in FIG. 9, although the data structure is not limited to the example illustrated. In some examples, the data generation program discussed above, e.g., with respect to FIGS. 1 and 3 may be configured to populate the training data data structure 144 with experimental data and/or simulated data determined by the simulation program(s). For example, the information included for each filter design may include the product information (e.g., for the device that will have filter installed), as well as operation conditions and filter configurations including topology and component combinations.

In this example, the training data data structure 144 includes input information 902 and output information 904, which are separated to facilitate the training process. The input information 902 may include product information 906, operational conditions 908, and filter configuration 910. The product information 906 may include product type 912 and product ID 914. The operational conditions 908 may include voltage 916, current 918, and frequency 920. The filter configuration 910 may include a topology 922 and components 924, e.g., as discussed above with respect to FIG. 5. Further, the output information 904 include the CE noise 926 in dB and the corresponding frequency band 928, such as AM band and FM band.

Figure 10:
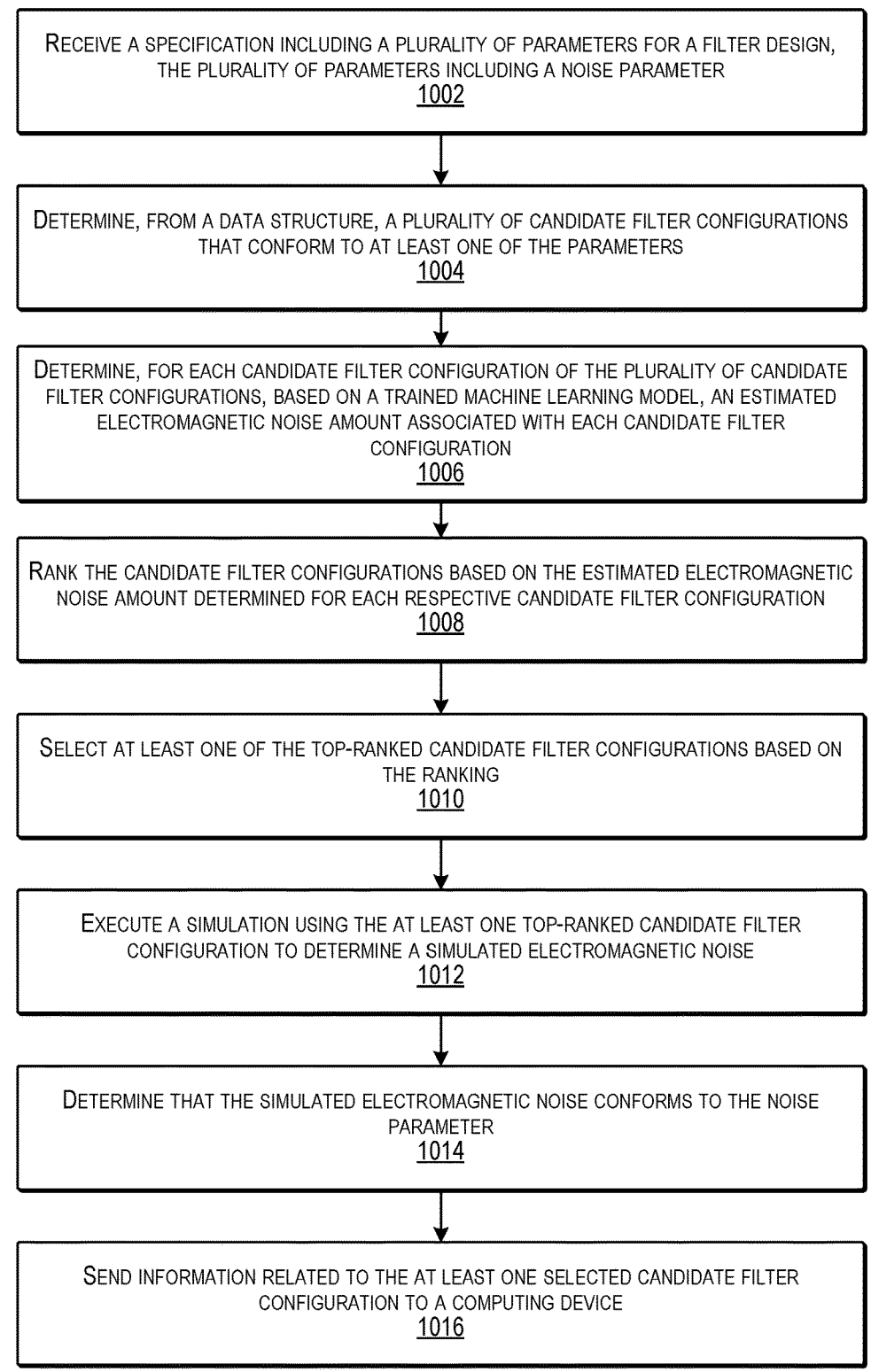
FIG. 10 is a flow diagram illustrating an example process according to some implementations.

FIG. 10 is a flow diagram illustrating an example process 1000 according to some implementations. In some examples, the process 1000 may be performed by one or more processors executing the filter design program 118, which may include execution of the auto-selection program 124, the fast noise estimation program 126, the ranking and selection program 128, and/or the UI program 130. Thus, the process 1000 may be executed by the service computing device 102, as discussed above, or other suitable computing device.

At 1002, the computing device may receive a specification including a plurality of parameters for a filter design, the plurality of parameters including a noise parameter.

At 1004, the computing device may determine, from a data structure, a plurality of candidate filter configurations that conform to at least one of the parameters.

At 1006, the computing device may determine, for each candidate filter configuration of the plurality of candidate filter configurations, based on a trained machine learning model, an estimated electromagnetic noise amount associated with each candidate filter configuration.

At 1008, the computing device may rank the candidate filter configurations based on the estimated EMI noise amount determined for each respective candidate filter configuration. For example, the candidate filter configurations may be rank in order from lowest noise to highest noise.

At 1010, the computing device may select at least one of the top-ranked candidate filter configurations based on the ranking. In some cases, the computing device may select K candidates having the lowest noise (i.e., lower than the remaining candidates not selected).

At 1012, the computing device may execute a simulation using the at least one top-ranked candidate filter configuration to determine a simulated EMI noise.

At 1014, the computing device may determine that the simulated EMI noise conforms to the noise parameter.

At 1016, the computing device may send information related to the at least one selected candidate filter configuration to a computing device.

The example processes described herein are only examples of processes provided for discussion purposes.

Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
    one or more processors;
    one or more non-transitory computer-readable media storing instructions that, when executed by the one or more processors, program the one or more processors to perform operations comprising:
        receiving a plurality of parameters for a filter design, the plurality of parameters including a noise parameter;
        determining a plurality of candidate filter configurations that match at least one of the parameters;
        determining, for each candidate filter configuration of the plurality of candidate filter configurations, based on a trained machine learning model, an estimated electromagnetic interference (EMI) noise amount associated with the candidate filter configuration;
        ranking the candidate filter configurations based on the estimated EMI noise amount determined as outputs of the machine learning model for each respective candidate filter configuration;
        selecting a subset of highest ranked candidate filter configurations of the candidate filter configurations based on the ranking determined based on the outputs of the machine learning model;
        executing respective simulations of respective candidate filter configurations included in the selected subset of highest ranked candidate filter configurations by executing the respective simulations of the respective candidate filter configurations with a simulation of a system in which the respective candidate filter configurations are intended to be used to determine a simulated EMI noise for the respective candidate filter configurations; and
        sending information related to at least one of the respective candidate filter configurations to a computing device.

2. The system as recited in claim 1, wherein the plurality of parameters include at least one of a size of a filter or a cost of the filter.

3. The system as recited in claim 2, wherein the operation of determining a plurality of candidate filter configurations that match at least one of the parameters further comprises:
    traversing a data structure that includes filter configurations including filter topology information and filter component information; and
    identifying as one of the candidate filter configurations a respective one of the filter configurations having a size and cost that is less than a size and cost specified in the plurality of parameters.

4. The system as recited in claim 1, wherein the operation of ranking the candidate filter configurations comprises ranking the candidate filter configurations in order from lowest estimated EMI noise amount to highest estimated EMI noise amount.

5. The system as recited in claim 1, wherein the operation of selecting the subset of highest ranked candidate filter configurations based on the ranking further comprises selecting K of the candidate filter configurations having the lowest estimated EMI noise amount, wherein K is a number specified by at least one of:
    a user who submitted the parameters;
    an administrator; or
    a system setting.

6. The system as recited in claim 1, the operations further comprising;
    executing a plurality of simulations using a respective plurality of filter configurations to generate simulation training data for the machine learning model; and
    training the machine learning model, at least in part with the simulation training data.

7. The system as recited in claim 1, wherein sending the information related to at least one of the respective candidate filter configurations to the computing device causes, at least partially, the computing device to send the at least one respective candidate filter configuration to an automated manufacturing system to generate a prototype of the at least one respective candidate filter configuration.

8. A method comprising:
    receiving, by one or more processors, a plurality of parameters for a filter design, the plurality of parameters including a noise parameter;
    determining a plurality of candidate filter configurations based on at least one of the parameters;
    determining, for each candidate filter configuration of the plurality of candidate filter configurations, based on a trained machine learning model, an estimated electromagnetic interference (EMI) noise associated with the candidate filter configuration;
    ranking the candidate filter configurations based on the estimated EMI noise amount determined as outputs of the machine learning model for each respective candidate filter configuration;
    selecting a subset of highest ranked candidate filter configurations of the candidate filter configurations based on the ranking determined based on the outputs of the machine learning model;

executing respective simulations of respective candidate filter configurations included in the selected subset of highest ranked candidate filter configurations by executing the respective simulations of the respective candidate filter configurations with a simulation of a system in which the respective candidate filter configurations are intended to be used to determine a simulated EMI noise for the respective candidate filter configurations; and sending information related to at least one of the respective candidate filter configurations to a computing device.

9. The method as recited in claim 8, wherein sending the information related to the at least one respective candidate filter configuration includes determining that the simulated EMI noise for the respective candidate filter configuration is less than the noise parameter.

10. The method as recited in claim 8, wherein ranking the candidate filter configurations based on the estimated EMI noise comprises ranking the candidate filter configurations in order from lowest estimated EMI noise amount to highest estimated EMI noise amount.

11. The method as recited in claim 8, wherein the plurality of parameters include at least one of a size of a filter or a cost of the filter.

12. The method as recited in claim 11, wherein determining a plurality of candidate filter configurations based on at least one of the parameters further comprises:
traversing a data structure that includes filter configurations including filter topology information and filter component information; and
identifying as one of the candidate filter configurations a respective one of the filter configurations having a size and cost that is less than a size and cost specified in the plurality of parameters.

13. The method as recited in claim 8, wherein selecting the subset of highest ranked candidate filter configurations based on the ranking further comprises selecting K of the candidate filter configurations having a lower estimated EMI noise level than remaining candidate filter configurations, wherein K is an integer specified by at least one of:
a user who submitted the parameters;
an administrator; or
a system setting.

14. The method as recited in claim 8, further comprising executing a plurality of simulations using a respective plurality of filter configurations to generate simulation training data for the machine learning model; and
training the machine learning model, at least in part with the simulation training data.

15. One or more computer-readable media storing instructions that, when executed by one or more processors, program the one or more processors to perform operations comprising:
receiving, from a computing device, a plurality of parameters for a filter design, the plurality of parameters including a noise parameter;
determining a plurality of candidate filter configurations based on at least one of the parameters;
determining, for each candidate filter configuration of the plurality of candidate filter configurations, based on a trained machine learning model, an estimated electromagnetic interference (EMI) noise associated with the candidate filter configuration;
ranking the candidate filter configurations based on the estimated EMI noise amount determined as outputs of the machine learning model for each respective candidate filter configuration;
selecting a subset of highest ranked candidate filter configurations of the candidate filter configurations based on the ranking determined based on the outputs of the machine learning model;
executing respective simulations of respective candidate filter configurations included in the selected subset of highest ranked candidate filter configurations by executing the respective simulations of the respective candidate filter configurations with a simulation of a system in which the respective candidate filter configurations are intended to be used to determine a simulated EMI noise for the respective candidate filter configurations; and
sending information related to at least one of the respective candidate filter configurations to the computing device.

16. The one or more computer-readable media as recited in claim 15, wherein sending the information related to the at least one respective candidate filter configuration includes determining that the simulated EMI noise for the respective candidate filter configuration is less than the noise parameter.

17. The one or more computer-readable media as recited in claim 15, wherein the plurality of parameters include at least one of a size of a filter or a cost of the filter.

18. The one or more computer-readable media as recited in claim 17, wherein the operation of determining a plurality of candidate filter configurations based on at least one of the parameters further comprises:
traversing a data structure that includes filter configurations including filter topology information and filter component information; and
identifying as one of the candidate filter configurations a respective one of the filter configurations having a size and cost that is less than a size and cost specified in the plurality of parameters.

19. The one or more computer-readable media as recited in claim 15, wherein sending the information related to at least one of the respective candidate filter configurations to the computing device causes, at least partially, the computing device to send the at least one respective candidate filter configuration to an automated manufacturing system to generate a prototype of the at least one respective candidate filter configuration.

20. The one or more computer-readable media as recited in claim 15, the operations further comprising:
executing a plurality of simulations using a respective plurality of filter configurations to generate simulation training data for the machine learning model; and
training the machine learning model, at least in part with the simulation training data.

* * * * *